Sept. 9, 1930.                J. H. FISHER                1,775,452
       INSTRUMENT FOR EXAMINING THE INTERIOR OF GUN BARRELS
                       Filed June 27, 1927
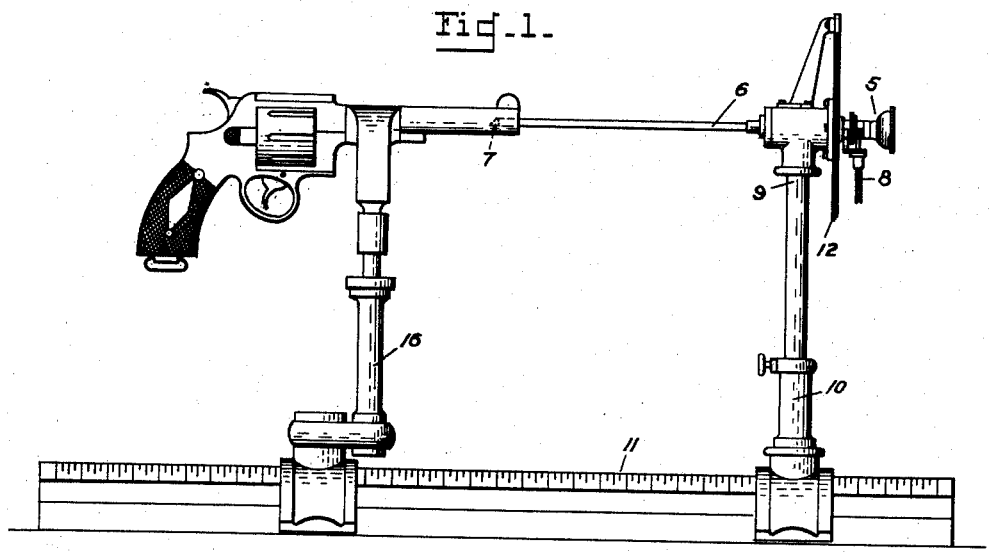
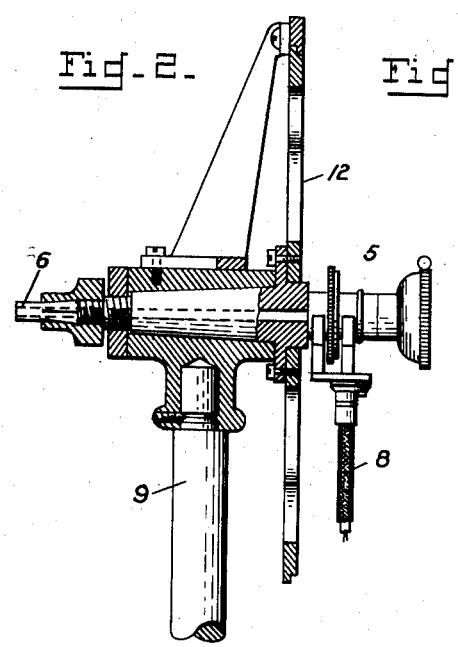
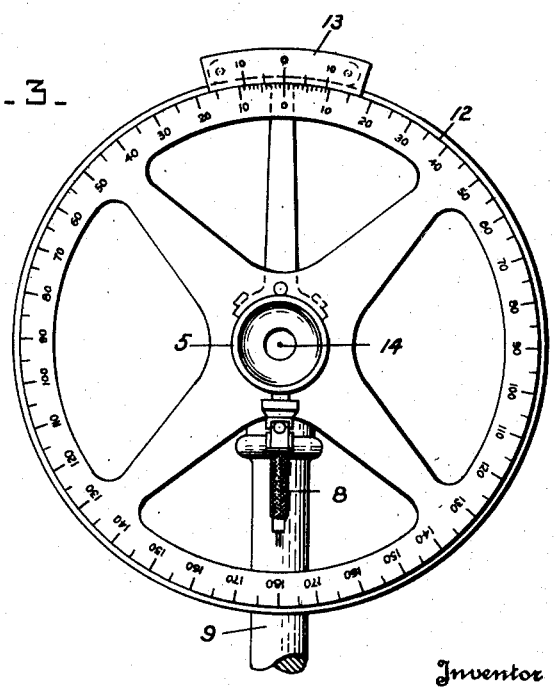
Inventor
John H. Fisher
By W. N. Roach
                                        Attorney Patented Sept. 9, 1930

1,775,452

UNITED STATES PATENT OFFICE

JOHN H. FISHER, OF HOLLIS, LONG ISLAND, NEW YORK, ASSIGNOR OF ONE-HALF TO CALVIN H. GODDARD, OF NEW YORK, N. Y.

INSTRUMENT FOR EXAMINING THE INTERIOR OF GUN BARRELS

Application filed June 27, 1927. Serial No. 201,799.

This invention relates to an instrument for examining the interior of gun barrels and tubes.

An instrument of this character finds especial application (a) In studying the accuracy life of a gun barrel. In testing the accuracy life of a certain type of barrel, with a given bullet and powder charge, instead of having to use a number of barrels, sectioning one lengthwise after 500 rounds, a second after 1,000 rounds, and so on, a single barrel may be used throughout, examined at different periods in the testing, the results recorded, and the experiment continued.

(b) In determining whether a barrel has been fired, if so, how recently, and with what types of powder and bullet. A determination of this character would find especial application in criminal investigations.

(c) In studying the relative effects upon the condition of a given bore of various powders, primers, and bullets, together with the effect of erosion from continued firing, neglect, exposure to moist atmosphere, or other influences.

(d) In determining the pitch of the rifling within a given barrel, when it is not already known.

The instrument is characterized by a novel and compact arrangement which permits inspection of any type of arm without removing the barrel thereof.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing wherein:

Fig. 1 is a view in side elevation of the instrument showing its relation to a gun;

Fig. 2 is a longitudinal sectional view through the instrument;

Fig. 3 is a view in rear elevation thereof.

Referring to the drawings by numerals of reference:

The instrument comprises a right angle telescope 5 having secured to one end a tube 6 of a diameter capable of permitting its insertion in the gun barrel to be examined and having in its forward extremity a prism reflector 7. Illumination for the field of the instrument may be provided in any accepted manner, the source of current being admitted as at 8 adjacent the eye piece of the instrument.

The telescope is horizontally mounted in a socket 9 which is attachable to an upright adjustable support 10 arranged for sliding movement on a bed plate 11 graduated in linear units of measure.

In order that the amount of rotation of the telescope may be measured it is provided with an annular scale 12 graduated in degrees, which scale is readable against a fixed index 13 carried by the socket.

The distal lens of the telescope is provided with an axial mark which establishes a reference point indicated at 14 in the center of the eye piece.

In employing the instrument the weapon whose barrel is to be examined is mounted on an adjustable carrier 16 slidable on the bed plate 11 and the tube 6 of the telescope is inserted in the barrel and moved until the reference point 14 appears to be touching the edge of a groove in the rifling. The telescope is then slowly rotated a given amount, for example 45°, and the gun is simultaneously displaced so that the reference point 14 appears to travel along the edge of the groove. Assuming that the gun has been displaced 2 inches during the one-eighth revolution of the instrument it will be apparent that the rate of pitch is one turn in 16 inches.

While the invention is disclosed in connection with a pistol barrel it will be evident that it may be employed not only with any type of gun barrel but also to determine the pitch of a thread or surface condition in any hollow article.

I claim:

1. An instrument for examining the interior of gun barrels embodying a rotatably mounted right angle telescope, a portion of which is capable of insertion in a gun barrel for imaging the inner periphery of the barrel, a reference point in the optical axis of the telescope, and means for measuring the amount of rotation of the telescope.

2. In an apparatus for examining the interior of hollow articles, a support, a right angle telescope rotatably mounted in said support and having a portion capable of insertion in the article for imaging the inner periphery of the article, a reference point in the telescope, and means for measuring the amount of rotation of the telescope.

3. In apparatus for examining the interior of gun barrels, a graduated bed plate, a carrier slidable on the bed plate and having means for mounting a barrel, a support slidable on the bed plate, a right angle telescope rotatably mounted in the support and having a portion capable of insertion in the barrel for imaging the inner periphery of the barrel, means for measuring the amount of rotation of the telescope, and a reference point in the telescope.

JOHN H. FISHER.